(12) United States Patent
Pan et al.

(10) Patent No.: US 11,269,170 B2
(45) Date of Patent: Mar. 8, 2022

(54) SEPARATE MICROSCOPY SYSTEM AND ADJUSTING METHOD THEREOF

(71) Applicant: CHROMA ATE INC., Taoyuan (TW)

(72) Inventors: Shih-Yao Pan, Tao-Yuan Hsien (TW); Yu-Yen Wang, Tao-Yuan Hsien (TW); Tsung-Hsien Ou, Tao-Yuan Hsien (TW); Kuo-Wei Huang, Tao-Yuan Hsien (TW)

(73) Assignee: CHROMA ATE INC., Taoyuan (TW)

( * ) Notice: Subject to any disclaimer, the term of this patent is extended or adjusted under 35 U.S.C. 154(b) by 222 days.

(21) Appl. No.: 16/719,386

(22) Filed: Dec. 18, 2019

(65) Prior Publication Data

US 2020/0209603 A1 Jul. 2, 2020

(30) Foreign Application Priority Data

Dec. 28, 2018 (TW) .................................. 107147601

(51) Int. Cl.
*G02B 21/00* (2006.01)
*G02B 21/02* (2006.01)
*G02B 21/36* (2006.01)

(52) U.S. Cl.
CPC ............. *G02B 21/02* (2013.01); *G02B 21/36* (2013.01)

(58) Field of Classification Search
CPC .......... G02B 7/00; G02B 7/003; G02B 7/023; G02B 7/16; G02B 21/00; G02B 21/02; G02B 21/248; G02B 21/26

USPC .................................. 359/368–390, 819–830
See application file for complete search history.

(56) References Cited

U.S. PATENT DOCUMENTS

| | | | | |
|---|---|---|---|---|
| 2,285,768 A | * | 6/1942 | Drucker ................... | G02B 7/04 359/819 |
| 5,024,513 A | * | 6/1991 | Hayashi .................. | G02B 21/24 359/379 |
| 5,140,470 A | * | 8/1992 | Luecke ................... | G02B 7/004 359/818 |
| 5,530,547 A | * | 6/1996 | Arnold .................... | G01M 11/04 356/458 |
| 2006/0092503 A1 | * | 5/2006 | Saunders ............. | G02B 25/001 359/368 |

* cited by examiner

*Primary Examiner* — Thong Q Nguyen
(74) *Attorney, Agent, or Firm* — Muncy, Geissler, Olds & Lowe, P.C.

(57) ABSTRACT

A separate microscopy system, applied to observe a specimen positioned on a stage and further to image the specimen on an imaging device, includes an ocular-lens unit, an adjustment unit and an objective-lens unit. The ocular-lens unit has an ocular-lens optical axis, and is manipulated to make the ocular-lens optical axis perpendicular to the stage. The adjustment unit is assembled to a side of the ocular-lens unit close to the stage. The objective-lens unit has an objective-lens optical axis, and is assembled to a side of the adjustment unit close to the stage. The objective-lens unit is manipulated to be adjusted by the adjustment unit to make the ocular-lens optical axis, the objective-lens optical axis and the imaging device co-axially and perpendicular to the stage, such that the specimen can be imaged at an imaging center position of the imaging device. In addition, an adjusting method thereof is also provided.

10 Claims, 6 Drawing Sheets

SEPARATE MICROSCOPY SYSTEM AND ADJUSTING METHOD THEREOF

This application claims the benefit of Taiwan Patent Application Serial No. 107147601, filed on Dec. 28, 2018, the subject matter of which is incorporated herein by reference.

BACKGROUND OF THE INVENTION

(1) Field of the Invention

The invention relates to a microscopy system, and more particularly to the separate microscopy system.

(2) Description of the Prior Art

In this world, though plenty of creatures and structures are too small to be visible simply by naked eyes, yet the microscopy system provides a useful and powerful means for people to observe these creatures and structures.

Referring now to FIG. 1, a conventional microscopy system is schematically shown. As illustrated, the conventional microscopy system PA1 for observing a specimen (not shown in the figure) on a stage PAE includes an ocular-lens unit PA11 and an objective-lens unit PA12.

The ocular-lens unit PA11 has an ocular-lens length PAL1 and an ocular-lens magnification rate. The objective-lens unit PA12, also having an objective-lens length PAL2 and an objective-lens magnification rate, is connected with the ocular-lens unit PA11 by being positioned between the ocular-lens unit PA11 and the stage PAE. When a user is to observe a specimen, the microscopy system PA1 is firstly adjusted to align the objective-lens unit PA12 with the specimen, so that the specimen can be observed within a visual field of the microscopy system PA1. Nevertheless, while in adjusting the angling of the microscopy system PA1, two features of the conventional microscopy system PA1 to affect precision observation are innegligible. One of these two features is the volume or weight of the microscopy system PA1, in particular the ocular-lens unit PA11 whose length PAL1 of the ocular-lens unit PA11 is longer than the objective-lens length PAL2. Another feature is the high magnification rate of the microscopy system PA1, especially at the objective-lens unit PA12 who has an objective-lens magnification rate greater than the ocular-lens magnification rate. With the aforesaid two features, the microscopy system PA1 is hard to be adjusted. In particular, even a slight deviation exists in adjusting the microscopy system PA1, the specimen could miss the visual field defined by the objective lens. Obviously, difficulty in adjusting the microscopy system PA1 is comparatively huge.

SUMMARY OF THE INVENTION

In view that the ocular-lens unit of the conventional microscopy system is directly connected with the objective-lens unit, from which various problems arise due to difficulty in individually adjusting the ocular-lens unit or the objective-lens unit, accordingly, it is an object of the present invention to provide a separate microscopy system that is able to resolve the aforesaid problems.

In this invention, the separate microscopy system, applied to observe a specimen positioned on a stage and further to image the specimen on an imaging device, includes an ocular-lens unit, an adjustment unit and an objective-lens unit. The ocular-lens unit has an ocular-lens optical axis, and is manipulated to make the ocular-lens optical axis perpendicular to the stage. The adjustment unit is assembled to a side of the ocular-lens unit close to the stage. The objective-lens unit has an objective-lens optical axis, and is assembled to a side of the adjustment unit close to the stage. The objective-lens unit is manipulated to be adjusted by the adjustment unit to make the ocular-lens optical axis, the objective-lens optical axis and the imaging device co-axially and perpendicular to the stage, such that the specimen can be imaged at an imaging center position of the imaging device.

In one embodiment of the present invention, an ocular-lens length of the ocular-lens unit is larger than an objective-lens length of the objective-lens unit.

In one embodiment of the present invention, an ocular-lens magnification rate of the ocular-lens unit is smaller than an objective-lens magnification rate of the objective-lens unit.

In one embodiment of the present invention, the ocular-lens unit, the adjustment unit and the objective-lens unit are orderly coupled by at least one locking element.

In one embodiment of the present invention, the adjustment unit is a kinematic mount.

In one embodiment of the present invention, the adjustment unit includes an ocular-lens connecting member, an ocular-lens connecting member, a plurality of spring, a ball and a plurality of extendable contact members. The ocular-lens connecting member is detachably connected with the ocular-lens unit. The objective-lens connecting member is detachably connected with the objective-lens unit by opposing to the ocular-lens connecting member. The plurality of springs is used for coupling the ocular-lens connecting member and the objective-lens connecting member. The ball, disposed between the ocular-lens connecting member and the objective-lens connecting member, is used for preventing the ocular-lens connecting member from direct contact with the objective-lens connecting member. The plurality of extendable contact members, disposed by penetrating the ocular-lens connecting member, adjustably contacts against the objective-lens connecting member to adjust the objective-lens connecting member.

In one embodiment of the present invention, the ocular-lens connecting member is furnished with an ocular-lens mounting hole for assembling the ocular-lens unit.

In one embodiment of the present invention, the objective-lens connecting member is furnished with an objective-lens mounting hole for assembling the objective-lens unit.

In another aspect of the present invention, an adjusting method, applied to the aforesaid separate microscopy system, includes the steps of: (a) adjusting an ocular-lens unit to make an ocular-lens optical axis of the ocular-lens unit perpendicular to a stage positioning thereon a specimen; (b) utilizing an adjustment unit to connect the ocular-lens unit and an objective-lens unit; and, (c) utilizing the adjustment unit to adjust the objective-lens unit and to make an objective-lens optical axis of the objective-lens unit be co-axial with the ocular-lens optical axis.

As stated, in the separate microscopy system provided by the present invention, the adjustment unit is manipulated to adjust the objective-lens unit, so that the ocular-lens optical axis, the objective-lens optical axis and an imaging center axis of the imaging device can be adjusted co-axially.

All these objects are achieved by the separate microscopy system and the adjusting method of the same separate microscopy system described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a separate microscopy system and an adjusting method of the same separate microscopy system. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
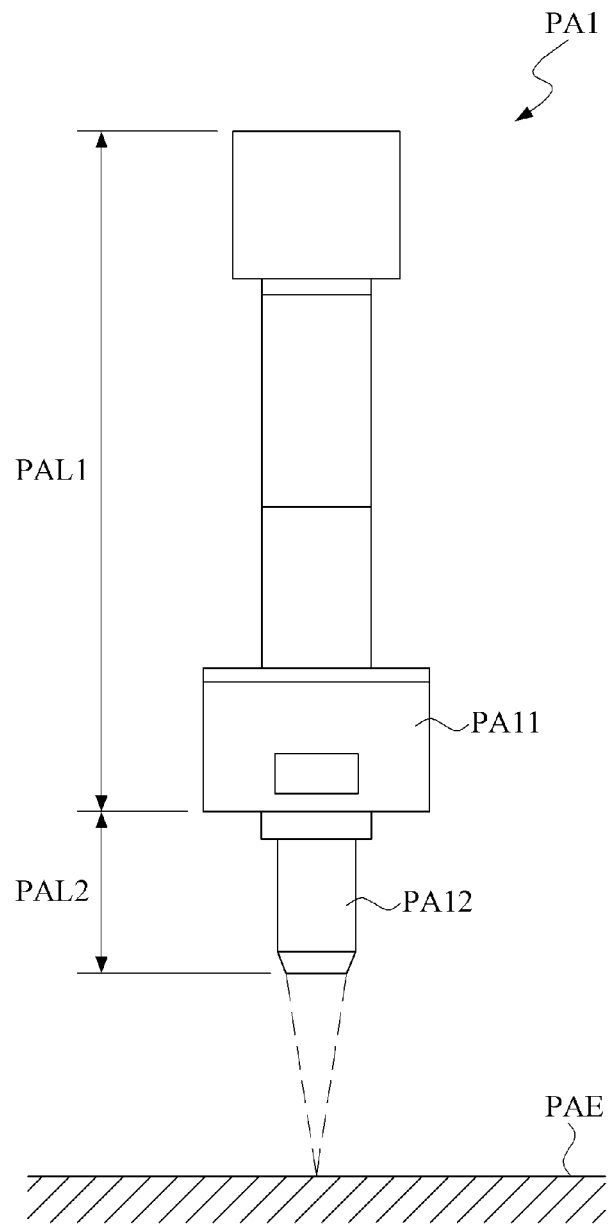
FIG. 1 is a schematic view of a conventional microscopy system.
Figure 2:
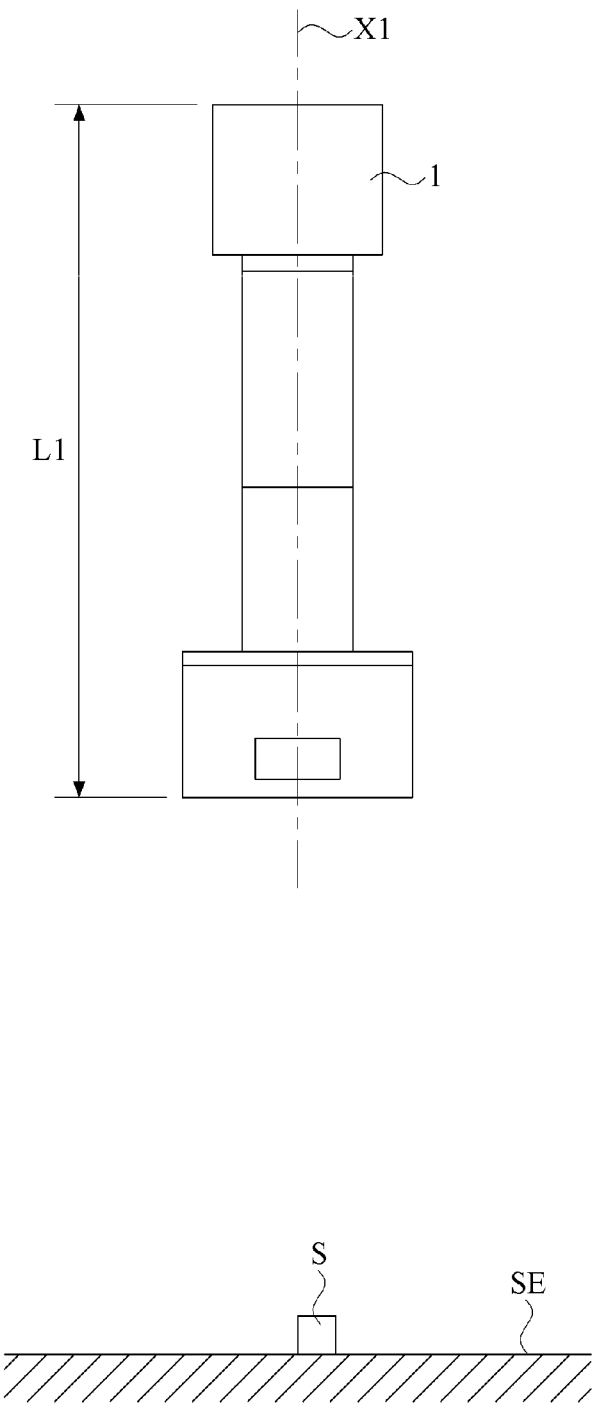
FIG. 2 is a schematic view of an ocular-lens unit of a first embodiment of the separate microscopy system in accordance with the present invention.
Figure 3:
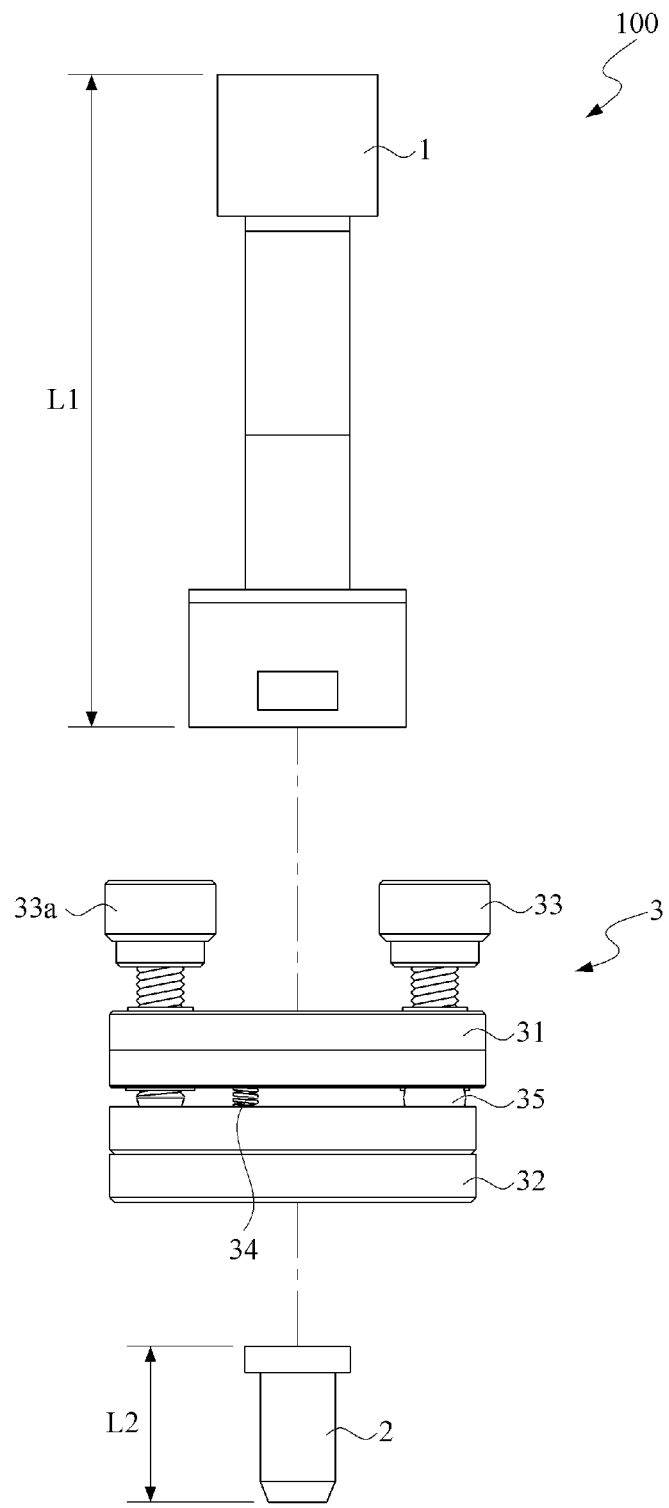
FIG. 3 is a schematic exploded view of the first embodiment of the separate microscopy system in accordance with the present invention.

Refer now to FIG. 2 and FIG. 3; where FIG. 2 is a schematic view of an ocular-lens unit of a first embodiment of the separate microscopy system in accordance with the present invention, and FIG. 3 is a schematic exploded view of the first embodiment of the separate microscopy system in accordance with the present invention. As shown, the separate microscopy system 100 is used for observing a specimen S deposed on a stage SE, and for the specimen S to be imaged on an imaging device (not shown in the figure). The separate microscopy system 100 includes an ocular-lens unit 1, an objective-lens unit 2 and an adjustment unit 3.

The ocular-lens unit 1 is defined with an ocular-lens magnification rate, an ocular-lens length L1 and an ocular-lens optical axis X1, in which the ocular-lens optical axis X1 is controlled to be perpendicular to the stage SE. Since the ocular-lens unit 1 is consisted of plural internal elements, thus accumulated manufacturing or assembling errors are inevitable. Hence, while in adjusting the microscopy system, the control manipulation is precise to align the ocular-lens optical axis X1 of the ocular-lens unit 1 to be perpendicular to the stage SE, not simply to have the ocular-lens unit 1 perpendicular to the stage SE.

Generally speaking, the technique for adjusting the ocular-lens unit 1 so as to make the ocular-lens optical axis X1 perpendicular to the stage SE is already matured in the art, so plenty of existing methods, after slight adjustments, can be applied to perform the aforesaid alignment, and thus details thereabout are omitted herein. In one exemplary embodiment, the displacement of the specimen S with respect to the imaging device can be used for judging the alignment by determining if the rectangular specimen S is imaged to become a trapezoidal specimen.

Figure 4:
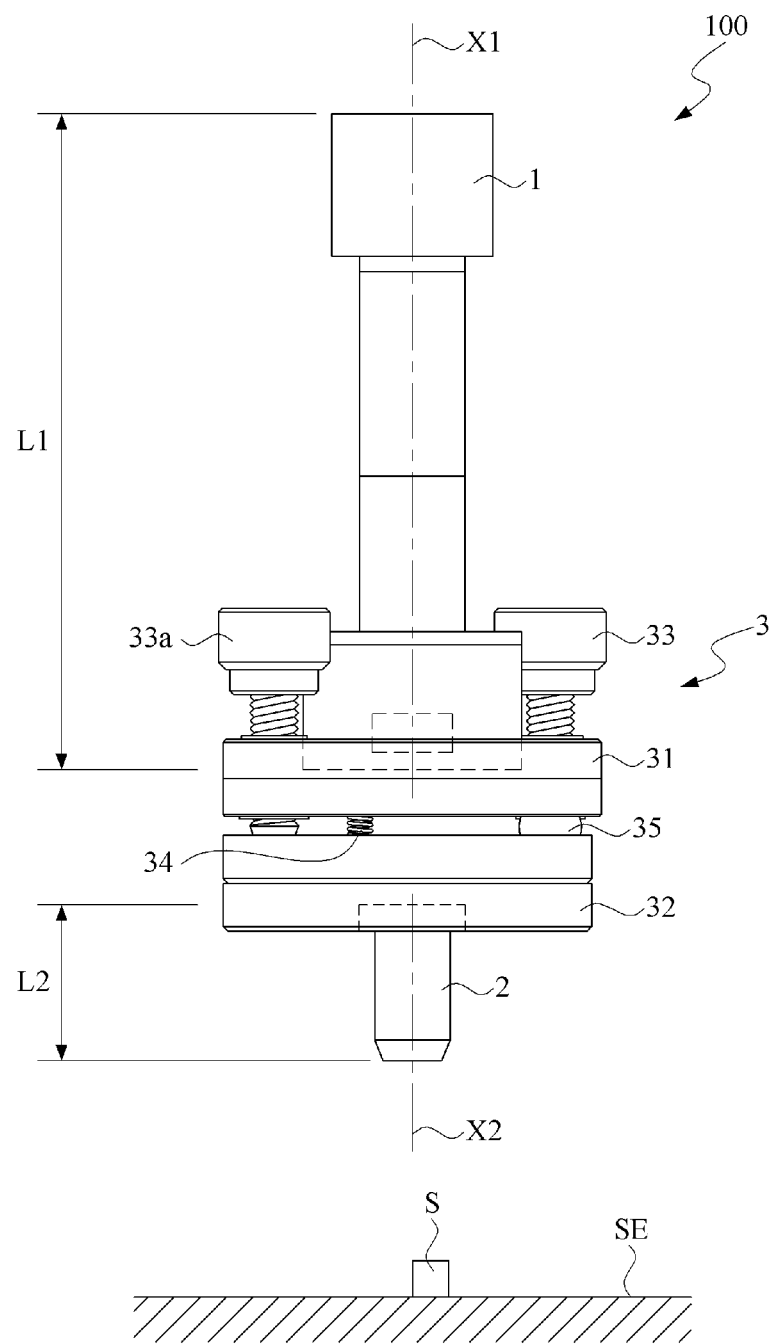
FIG. 4 is a schematic assembled view of the first embodiment of the separate microscopy system in accordance with the present invention.

The objective-lens unit 2 is defined with an objective-lens magnification rate, an objective-lens length L2 and an objective-lens optical axis X2, referring to FIG. 4; in which the objective-lens length L2 is smaller than the ocular-lens length L1, the objective-lens magnification rate is greater than the ocular-lens magnification rate, and thus the objective-lens unit 2 is lighter than the ocular-lens unit 1. Therefore, the acuity of the objective-lens unit 2 is much more significant than that of the ocular-lens unit 1.

The adjustment unit 3 is assembled to the ocular-lens unit 1 by having one side of the adjustment unit 3 to connect a side of the ocular-lens unit 1 that is close to the stage SE, and another side of the adjustment unit 3 is assembled to a side of the objective-lens unit 2 that is opposed to the side thereof facing the stage SE.

In this embodiment, the adjustment unit 3, as a kinematic mount, includes an ocular-lens connecting member 31, an objective-lens connecting member 32 and a plurality of extendable contact members 33, 33a (two shown in the figure). The ocular-lens connecting member 31 are detachably connected with the objective-lens connecting member 32 via two springs 34 and a ball 35. Each of the springs 34 is introduced to substantially couple the ocular-lens connecting member 31 and the objective-lens connecting member 32 without any separation. In FIG. 4, only one spring 34 is sketched and labeled, while another spring disposed spatially between the ball 35 and the extendable contact member 33 is not shown herein due to visual blocking by the ball 35. In this embodiment, the ball 35 is used for preventing the ocular-lens connecting member 31 from direct contact with the objective-lens connecting member 32. The ocular-lens connecting member 31 is used for coupling the ocular-lens unit 1, and the objective-lens connecting member 32 is used for being detachably connected with the objective-lens unit 2 by opposing to the ocular-lens connecting member 31. Detail applications of the extendable contact members 33 and 33a will be elucidated as follows.

Figure 5:
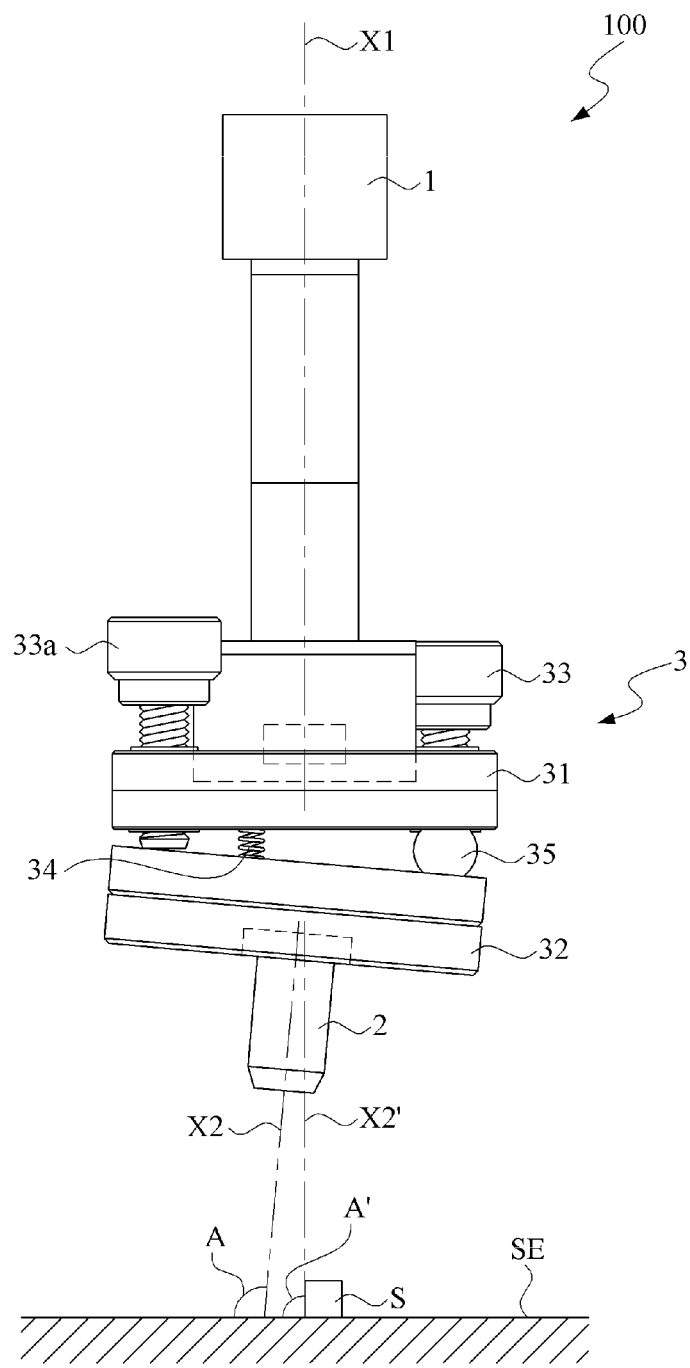
FIG. 5 demonstrates schematically an angle adjustment of the first embodiment of the separate microscopy system in accordance with the present invention.

Then, refer now to FIG. 4 and FIG. 5; where FIG. 4 is a schematic assembled view of the first embodiment of the separate microscopy system in accordance with the present invention, and FIG. 5 demonstrates schematically an angle adjustment of the first embodiment of the separate microscopy system in accordance with the present invention. As shown, the separate microscopy system 100 is used for observing the specimen S on the stage SE, and is consisted of the ocular-lens unit 1, the adjustment unit 3, the objective-lens unit 2, the specimen S and the stage SE in a spatial order from up to down.

In this embodiment, the ocular-lens unit 1 is mounted to an ocular-lens mounting hole (not shown in the figure) of the ocular-lens connecting member 31 (i.e., the ocular-lens unit 1 is embedded into the ocular-lens mounting hole of the ocular-lens connecting member 31), and the objective-lens unit 2 is mounted to an objective-lens mounting hole (not shown in the figure) of the objective-lens connecting member 32 (i.e., the objective-lens unit 2 is embedded into the ocular-lens mounting hole of the objective-lens connecting member 32). However, in some other embodiments of the present invention, at least one locking element can be introduced to couple orderly the ocular-lens unit, the adjustment unit and the objective-lens unit.

As described above, the ocular-lens unit 1 is manipulated to adjust the ocular-lens optical axis X1 to be perpendicular to the stage SE. In practice, the extendable contact members 33, 33a of the adjustment unit 3, disposed by penetrating the ocular-lens connecting member 31, are applied to adjustably contact against the objective-lens connecting member 32, so that angling of the objective-lens unit 2 can be adjusted. As shown in FIG. 5, the extendable contact member 33 is manipulated to contact downward against the objective-lens connecting member 32, so that a side of the objective-lens connecting member 32 close to the extendable contact member 33 is adjusted to be lower than another side thereof close to the extendable contact member 33a. Namely, the objective-lens connecting member 32 is adjusted to make the objective-lens unit 2 slide toward the side having the extendable contact member 33a. Similarly, if the extendable contact member 33a is manipulated to be depressed downward, then the objective-lens connecting member 32 would drive the objective-lens unit 2 to slide toward the side having the extendable contact member 33.

As shown, the objective-lens optical axis X2 of the objective-lens unit 2 forms an angle A with respect to the stage SE, in which the angle A is greater than 90°. Obviously, the objective-lens optical axis X2 is not perpendicular to the stage SE. Through adjusting the extendable contact members 33, 33a, an angle A' formed between the objective-lens optical axis X2' of the objective-lens unit 2 and the stage SE can be achieved, in particular the angle A'=90°. It implies that the objective-lens optical axis X2' is perpendicular to the stage SE. Thus, the objective-lens optical axis X2' and the ocular-lens optical axis X1 are co-axial.

Through the extendable contact members 33, 33a of the adjustment unit 3 to adjust the objective-lens unit 2, the ocular-lens optical axis X1, the objective-lens optical axis X2, and an imaging center axis of the imaging device can be aligned co-axially, such that the imaging is free from distortion. Since manufacturing errors or deviations at the ocular-lens unit 1 and the objective-lens unit 2 are inevitable, thus the meaning of both the ocular-lens unit 1 and the objective-lens unit 2 being perpendicular to the stage SE cannot be read as that both the ocular-lens optical axis X1 and the objective-lens optical axis X2 are perpendicular to the stage SE. Namely, only when the ocular-lens optical axis X1 and the objective-lens optical axis X2 are both perpendicular to the stage SE, the imaging at the imaging device can be then undistorted. Generally, at this moment, the specimen S is imaged at an imaging center position of the imaging device.

In the separate microscopy system 100 provided by this present invention, after the ocular-lens unit 1 is adjusted, then the adjustment unit 3 can be applied to adjust the angling of the objective-lens unit 2. The acuity of the objective-lens unit 2 is higher than that of the ocular-lens unit 1 in this invention, but the acuity of the conventional ocular-lens unit PA11 is lower than that of the objective-lens unit PA12. Since, in the conventional microscopy system PA1, the acuity of the entire system is higher than that of the ocular-lens unit PA111, thus various problems would arise during the adjusting. On the other hand, according to the present invention, the ocular-lens unit 1 with less acuity would be adjusted firstly, and then the adjustment unit 3 would be applied to adjust the objective-lens unit 2 with higher acuity. Thereupon, aforesaid shortcomings in acuity caused by the direct connection of the conventional ocular-lens unit PA11 and the conventional objective-lens unit PA12 can be avoided.

In addition, since the weight of the objective-lens unit 2 is less than that of the ocular-lens unit 1. Thus, in comparison with the conventional design whose microscopy system PA1 (including both the ocular-lens unit PA11 and the objective-lens unit PA12) should be entirely adjusted, the present invention needs only to adjust the lighter objective-lens unit 2, and thus adjustment upon the heavier part can be avoided.

In this embodiment, the adjustment unit 3 can be, but not limited to, a kinematic mount. According to the present invention, the adjustment unit 3 can be other mechanisms that can integrate together the ocular-lens unit 1 and the objective-lens unit 2, and also can be manipulated to adjust the objective-lens unit 2.

Figure 6:
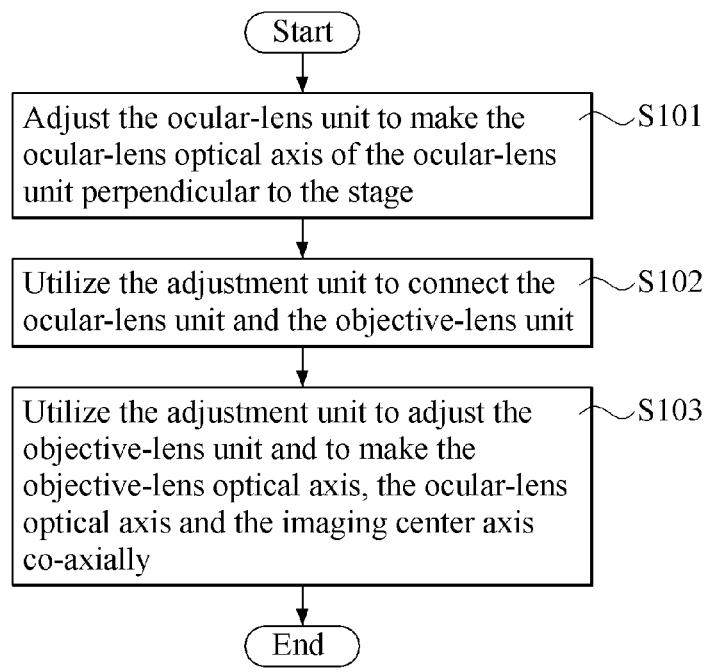
FIG. 6 is a flowchart of a first embodiment of the adjusting method of the separate microscopy system in accordance with the present invention.

Finally, referring now to FIG. 6, a flowchart of a first embodiment of the adjusting method of the separate microscopy system in accordance with the present invention is provided. As shown, the adjusting method of the separate microscopy system is particularly applied to the separate microscopy system 100 of FIG. 4, and includes the following Step S101 to Step S103.

Step S101: Adjust the ocular-lens unit 1 so as to have the ocular-lens optical axis of the ocular-lens unit perpendicular to the stage. Practically, Step S101 is used for adjusting the ocular-lens unit 1 so as to have the ocular-lens optical axis X1 perpendicular to the stage SE.

Step S102: Utilize the adjustment unit to connect the ocular-lens unit and the objective-lens unit. Practically, in Step S102, the adjustment unit 3 is used for coupling the ocular-lens unit 1 and the objective-lens unit 2. The adjustment unit 3 can be a kinematic mount or any other mechanism that can join the ocular-lens unit 1 and objective-lens unit 2, and con be manipulated to adjust the objective-lens unit 2.

Step S103: Utilize the adjustment unit to adjust the objective-lens unit so as to align the objective-lens optical axis, the ocular-lens optical axis and the imaging center axis co-axially. Practically, in Step S103, the adjustment unit 3 is used for adjusting the objective-lens unit 2 so as to have the objective-lens optical axis X2, the ocular-lens optical axis X1 and the imaging center axis to be co-axial. Thereupon, the image of the specimen S on the imaging device can be formed without distortion. In the present invention, the imaging device can be a camera, a charge-coupled device (CCD), or any device that can image the specimen S.

In summary, in the separate microscopy system and the adjusting method of the same separate microscopy system provided by the present invention, the ocular-lens unit is purposely manipulated to adjust the ocular-lens optical axis to be perpendicular to the stage, such the adjustment unit can be further used for adjusting the objective-lens unit so as to achieve coaxiality of the ocular-lens optical axis, the objective-lens optical axis and the imaging center axis.

In the art, since the ocular-lens unit is directly connected with the objective-lens unit, thus coaxial adjustment shall move always and simultaneously both the ocular-lens unit and the objective-lens unit. Further, other factors including lengths, weights and acuity of these units are involved to complicate the co-axial adjustment. However, with the separate microscopy system and the adjusting method of the same separate microscopy system in accordance with the present invention, the ocular-lens unit and the objective-lens unit can be separately adjusted, and particularly the objective-lens unit can be adjusted solely due to the adjustment unit is introduced to couple the ocular-lens unit and the objective-lens unit. Thereupon, the shortcomings in the art caused by the direct connection and co-movement of the ocular-lens unit and the objective-lens unit can be substantially resolved.

While the present invention has been particularly shown and described with reference to a preferred embodiment, it will be understood by those skilled in the art that various changes in form and detail may be without departing from the spirit and scope of the present invention.

What is claimed is:

1. A separate microscopy system, applied to observe a specimen positioned on a stage, comprising:

an ocular-lens unit, having an ocular-lens optical axis perpendicular to the stage;
an adjustment unit, configured as a kinematic mount, assembled to a side of the ocular-lens unit close to the stage, including:
an ocular-lens connecting member, detachably connected with the ocular-lens unit;
an objective-lens connecting member, detachably connected with an objective-lens unit by opposing to the ocular-lens connecting member;
a plurality of springs, used for coupling the ocular-lens connecting member and the objective-lens connecting member;
a ball, disposed between the ocular-lens connecting member and the objective-lens connecting member, used for preventing the ocular-lens connecting member from direct contact with the objective-lens connecting member; and
a plurality of extendable contact members, disposed by penetrating the ocular-lens connecting member, adjustably contacting against the objective-lens connecting member to adjust the objective-lens connecting member; and
the objective-lens unit, having an objective-lens optical axis, assembled to the objective-lens connecting member at a side of the adjustment unit close to the stage, adjusted by the objective-lens connecting member of the adjustment unit to make the ocular-lens optical axis and the objective-lens optical axis co-axially and perpendicular to the stage.

2. The separate microscopy system of claim 1, wherein an ocular-lens length of the ocular-lens unit is larger than an objective-lens length of the objective-lens unit.

3. The separate microscopy system of claim 1, wherein an ocular-lens magnification rate of the ocular-lens unit is smaller than an objective-lens magnification rate of the objective-lens unit.

4. The separate microscopy system of claim 1, wherein the ocular-lens connecting member is furnished with an ocular-lens mounting hole for assembling the ocular-lens unit.

5. The separate microscopy system of claim 1, wherein the objective-lens connecting member is furnished with an objective-lens mounting hole for assembling the objective-lens unit.

6. An adjusting method, applied to the separate microscopy system of claim 1, comprising the steps of:
(a) adjusting the ocular-lens unit to make the ocular-lens optical axis of the ocular-lens unit perpendicular to the stage positioning thereon the specimen;
(b) utilizing the adjustment unit to connect the ocular-lens unit and the objective-lens unit; and
(c) utilizing the adjustment unit to adjust the objective-lens unit and to make the objective-lens optical axis of the objective-lens unit be co-axial with the ocular-lens optical axis.

7. The adjusting method of claim 6, wherein an ocular-lens length of the ocular-lens unit is larger than an objective-lens length of the objective-lens unit.

8. The adjusting method of claim 6, wherein an ocular-lens magnification rate of the ocular-lens unit is smaller than an objective-lens magnification rate of the objective-lens unit.

9. The adjusting method of claim 6, wherein the ocular-lens connecting member is furnished with an ocular-lens mounting hole for assembling the ocular-lens unit.

10. The adjusting method of claim 6, wherein the objective-lens connecting member is furnished with an objective-lens mounting hole for assembling the objective-lens unit.

* * * * *